United States Patent [19]

Nakagami

[11] Patent Number: 4,489,473
[45] Date of Patent: Dec. 25, 1984

[54] METHOD FOR INSTALLING THERMAL INSULATION MATERIALS ON THE INNER SURFACE OF A DUCT

[75] Inventor: Kashiro Nakagami, Toyohashi, Japan

[73] Assignee: Isolite Babcock Refractories, Co., Ltd., Aichi, Japan

[21] Appl. No.: 357,514

[22] Filed: Mar. 12, 1982

[30] Foreign Application Priority Data

Apr. 17, 1981 [JP] Japan .............................. 56-058280

[51] Int. Cl.³ ............................................ B23P 11/02
[52] U.S. Cl. .................................. 29/451; 29/455 R; 138/140; 138/149
[58] Field of Search ............. 29/451, 455 R; 138/149, 138/140, DIG. 4, DIG. 8

[56] References Cited

U.S. PATENT DOCUMENTS

| 3,768,523 | 10/1973 | Schroeder | 138/149 X |
| 3,818,948 | 6/1974 | Hedges | 138/149 X |
| 3,921,273 | 11/1975 | Kondo et al. | 29/451 |
| 4,240,193 | 12/1980 | Krein | 29/451 |
| 4,273,161 | 6/1981 | McLaughlin | 29/451 X |

FOREIGN PATENT DOCUMENTS 244940  5/1963  Australia ............................ 138/149

Primary Examiner—Charlie T. Moon
Attorney, Agent, or Firm—Robert J. Edwards; Mark B. Quatt

[57] ABSTRACT

Thermal insulation material is installed on the inner surface of a duct by placing and compressing said material on a cylinder, inserting the resulting unit into a duct, and releasing the pressure on said material.

4 Claims, 9 Drawing Figures

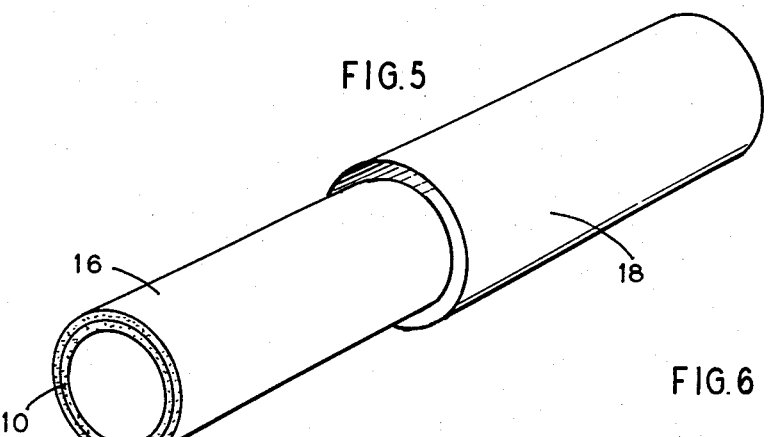
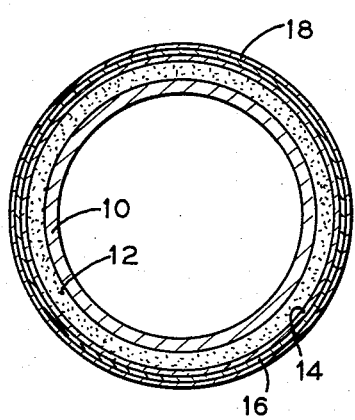
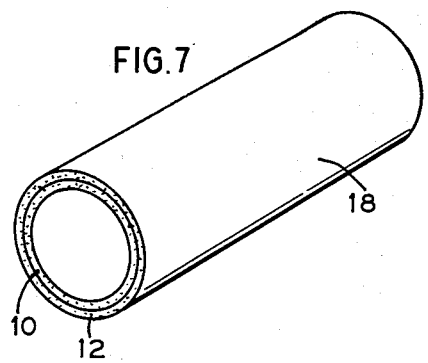
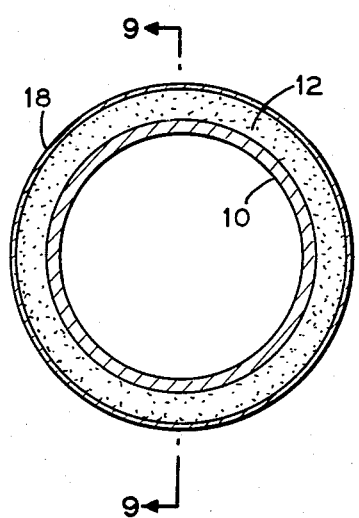
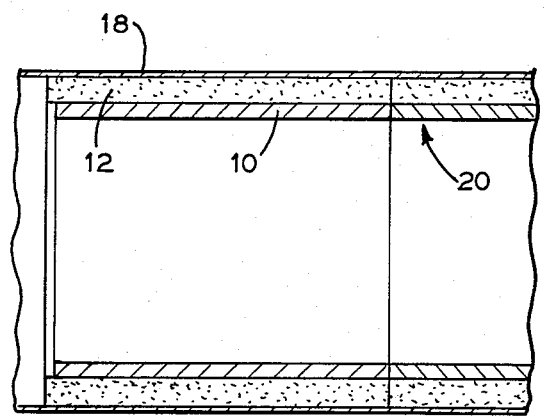

METHOD FOR INSTALLING THERMAL INSULATION MATERIALS ON THE INNER SURFACE OF A DUCT

BACKGROUND

This invention relates to a method of installing thermal insulation materials on the inner surface of a duct.

The installation of thermal insulation material on the inner surface of a duct is time-consuming, especially when a duct has a small diameter. The object of this invention is to provide a method by which it is possible to install, with a high degree of efficiency and uniformity, such soft and low-strength thermal insulation materials as ceramic fiber blankets, etc. on the inner surface of a duct.

SUMMARY

In order to attain the purpose of this invention, a compressible and restorable thermal insulation material is installed along the outer circumference of a cylinder which has a shape-maintaining capability, together with a sleeve which is installed on said outer circumference in such a manner that said sleeve will maintain said thermal insulation material under compression by means of compressing said thermal insulation material towards said cylinder, thereafter releasing the compression pressure which has been exerted on said thermal insulation material by said sleeve.

BRIEF DESCRIPTION OF THE DRAWINGS

In the accompanying drawings, forming a part of this specification, and in which reference numerals shown in the drawings designate like or corresponding parts throughout the same.

FIG. 5 is a perspective view of the thermal insulation cylinder unit inserted into one end of a duct;

FIG. 6 is a cross section view of a duct into which has been inserted thermal insulation material in accordance with the invention;

FIG. 7 is a perspective view of the thermal insulation cylinder unit installed on the inner surface of a duct;

FIG. 8 is a cross section of the thermal insulation cylinder unit installed on the inner surface of a duct; and FIG. 9 is a side cross-sectional view of a duct taken along line 3—3 of FIG. 8.

DETAILED DESCRIPTION

In the following, an explanation will be made by referring to an embodiment of this invention in which the installation is achieved by using, as a compressible and restorable thermal insulation material, a ceramic fiber blanket having a normal use limit of 1280° C.

This ceramic fiber blanket is compressible up to about 70% of its normal volume by means of a vacuum-pack compression, and said ceramic fiber blanket is restored to its original state, almost 100%, upon release of the vacuum-pack compression.

Figure 1:
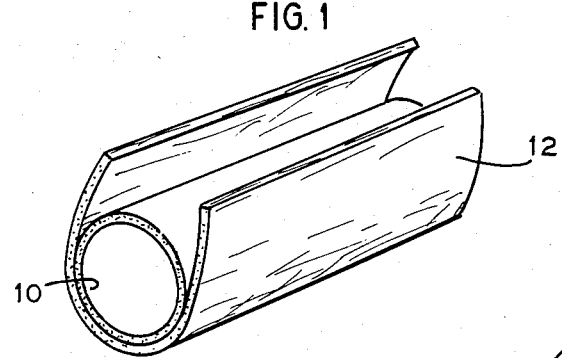
FIG. 1 is a perspective view of a cylinder with shape-maintaining capability around which a compressible and restorable thermal insulation material is installed.
Figure 2:
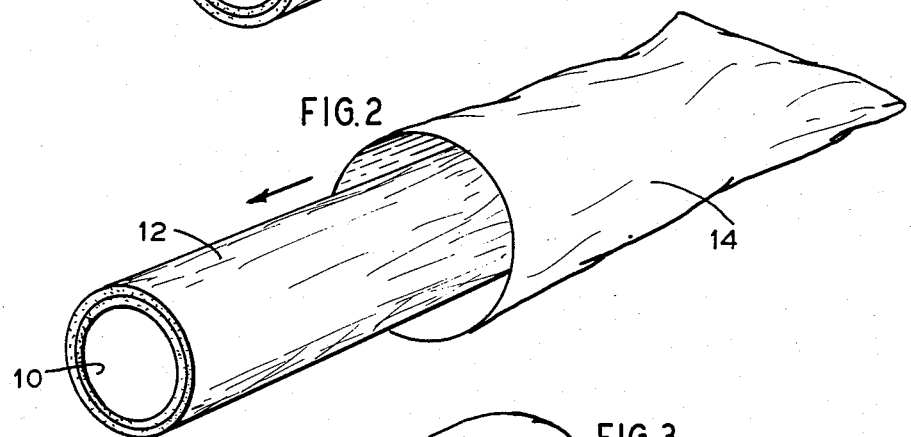
FIG. 2 is a perspective view of the prepared unit as it is inserted in a bag.
Figure 3:
FIG. 3 is a perspective view of the bagged cylinder.
Figure 4:
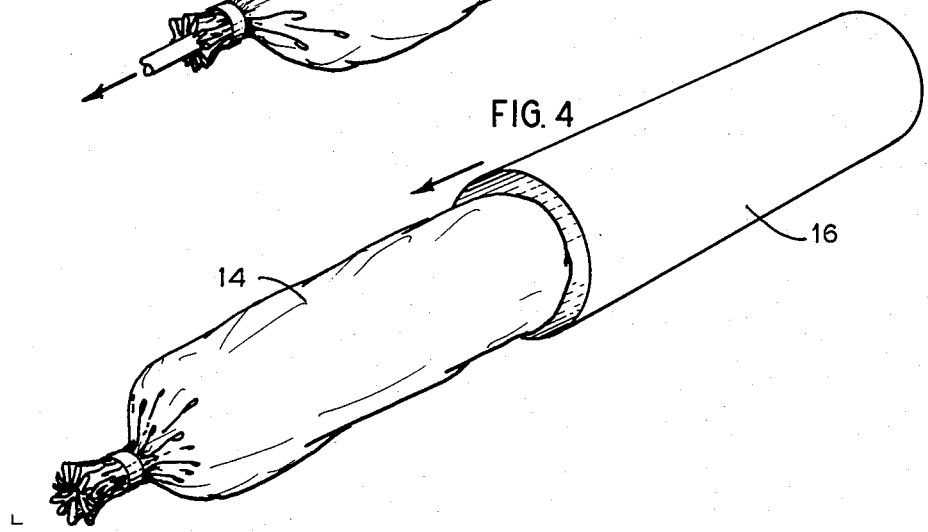
FIG. 4 is a perspective view of the compressed bagged cylinder as a sleeve is applied to the outer circumference of the unit.

A cylinder 10 made of formed ceramic fiber (FIG. 1) with dimensions of 450 mm inner diameter, 500 mm outer diameter, and 600 mm length was prepared, and said ceramic fiber blanket 12 was wound around the outer circumference of said cylinder (FIG. 2) with a uniform thickness of 62.5 mm in such a manner that said ceramic fiber blanket protruded by 5 mm on either end of said cylinder. Subsequently, the unit prepared in this way was inserted into a double cylindrical bag 14 made of high-density polyethylene film for the purpose of conducting the vacuum-pack compression (FIG. 3), and compression was then applied to said ceramic fiber blnket 12 in such a manner that the thickness of said ceramic fiber blanket became 40 mm on the outer circumference of said cylinder 10. If the unit treated in this way is left unattended, air will gradually filter through fine puncture holes created by the ceramic fiber pieces through the polyethylene film, so that the compressed item will eventually be restored to a state almost equivalent to its original size due to the gradual inflation. Therefore, a cylinder-shaped polyethylene film 16 was applied to cover the outer circumference of the unit (FIG. 4), and both ends of said polyethylene film bag 15 which was used for the vacuum-pack compression were cut in alignment with both ends of said cylinder, thereby releasing the vacuum. At this time, the outer diameter of the item was 590 mm, and the thickness of said ceramic fiber blanket was 45 mm.

The thermal insulation cylinder unit prepared in this way was inserted into one end of a duct 18 (FIGS. 5 and 6) of 600 mm inner diameter and 3,000 mm length. Then, said cylinder-shaped polyethylene film 16 was cut and torn by means of a metallic wire with a hook-shaped knife on one end (not shown), by inserting said metallic wire along the inner surface of the duct, thereby consequently allowing the ceramic fiber blanket to expand and to be pressed uniformly around the inner circumference of the duct (FIGS. 7 and 8). Thereafter, another thermal insulatin cylinder unit 20, which had been prepared in the same manner as mentioned above, was inserted inside the duct while mutually compressing the previously installed ceramic fiber blanket which was protruding from the end of said cylinder for the purpose of achieving a close contact of the end surfaces of the new ceramic fiber cylinder and the previously inserted ceramic fiber blanket, and thereafter said cylinder-shaped polyethylene film was cut and torn in the same manner as mentioned above for the purpose of similarly installing said ceramic fiber blanket on the inner surface of the duct (FIG. 9). By repeating this process, the thermal insulation material was installed along the entire length of the inner surface of the duct.

The above explanation refers to the installation of a thermal insulation material in a duct to be used for transporting high-temperature gas. However, it is readily understood here that a urethane foam sheet and other materials can also be used as the compressible and restorable thermal insulation materials, and a stainless steel tube can be used as said cylinder, when the installation is applied to a duct to be used for transporting low-temperature gas, such as for transporting gas which has been produced from liquified gas.

With this invention, it becomes possible to mass-produce said thermal insulation cylinder units at a factory and to install said thermal insulation cylinder units easily in ducts which have already been set up on site, thereby making it possible to install said thermal insulation cylinder units on the inner surface of the duct with a high degree of efficiency, thereby further decreasing the cost of installation.

What is claimed is:

1. A method for installing thermal insulation materials on the inner surface of a duct comprising:
   (a) preparing a ceramic fiber cylinder which has a shape-maintaining capability;
   (b) installing a compressible and restorable thermal insulation material along the outer circumference of said cylinder to form a prepared unit;
   (c) inserting said prepared unit into a bag;
   (d) compressing said thermal insulation material on said cylinder by vacuum packing;
   (e) applying a sleeve to the outer circumference of said vacuum packed bag and compressed material;
   (f) cutting the ends of said vacuum packed bag to release the vacuum and allow said compresed insulation material to partially expand against the inside of said sleeve to form a thermal insulation cylinder unit;
   (g) inserting said thermal insulation cylinder unit into a duct;
   (h) cutting said sleeve;
   (i) allowing said sleeve and compressed thermal insulation material to further expand against the inner circumference of said duct; and
   (j) repeating the above steps until at least a substantial portion of the length of the duct is covered along its inner surface with thermal insulation material.

2. The method according to claim 1 wherein said compressible and restorable thermal insulation material is ceramic fiber blanket.

3. The method according to claim 1 wherein said bag is made of high-density polyethylene film.

4. The method according to claim 1 wherein said sleeve is made of a cylinder-shaped polyethylene film.

* * * * *